US010931763B2

(12) United States Patent
Walker et al.

(10) Patent No.: US 10,931,763 B2
(45) Date of Patent: Feb. 23, 2021

(54) SYSTEMS AND METHODS FOR OPAQUE OBJECT DELIVERY IN A COMMUNICATION NETWORK

(71) Applicant: QUALCOMM Incorporated, San Diego, CA (US)

(72) Inventors: Gordon Kent Walker, Poway, CA (US); Thomas Stockhammer, Bergen (DE); Charles Nung Lo, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 381 days.

(21) Appl. No.: 15/845,685

(22) Filed: Dec. 18, 2017

(65) Prior Publication Data

US 2018/0198871 A1 Jul. 12, 2018

Related U.S. Application Data

(60) Provisional application No. 62/445,143, filed on Jan. 11, 2017.

(51) Int. Cl.
*H04L 29/08* (2006.01)
*H04L 29/06* (2006.01)
*H04L 12/66* (2006.01)

(52) U.S. Cl.
CPC .............. *H04L 67/16* (2013.01); *H04L 12/66* (2013.01); *H04L 65/1033* (2013.01); *H04L 65/4069* (2013.01); *H04L 65/4076* (2013.01); *H04L 67/02* (2013.01)

(58) Field of Classification Search
CPC ..... H04L 67/16; H04L 12/66; H04L 65/1033; H04L 65/4069
USPC .......................................................... 709/223
See application file for complete search history.

(56) References Cited

U.S. PATENT DOCUMENTS

| 8,914,471 | B2 | 12/2014 | Pazos et al. | |
|---|---|---|---|---|
| 2014/0220993 | A1* | 8/2014 | Cordeiro | H04W 72/0486 455/452.1 |
| 2014/0324785 | A1* | 10/2014 | Gupta | G06F 16/2365 707/689 |
| 2014/0359152 | A1* | 12/2014 | Heng | H04L 65/602 709/231 |
| 2015/0143115 | A1* | 5/2015 | Gupta | H04L 63/10 713/168 |
| 2015/0271205 | A1* | 9/2015 | Duminuco | H04L 63/0281 713/151 |
| 2017/0187575 | A1* | 6/2017 | Waugh | H04L 41/5009 |

(Continued)

*Primary Examiner* — Joshua D Taylor
(74) *Attorney, Agent, or Firm* — Holland & Hart LLP

(57) ABSTRACT

Systems and methods for delivery of opaque objects provided by a content provider to network nodes within a communication network are described. Opaque objects may comprise data objects whose data structure is not natively defined in the network interface and thus have a data type and/or structure that would be unknown to systems of the network. Communication systems may be configured according to embodiments to facilitate delivery of such opaque objects, such as by providing a robust network interface between a content provider system and the network through which network information is provided from the network to the content provider system and/or delivery manifest information for opaque objects is provided from the content provider system to the network.

14 Claims, 8 Drawing Sheets

(56) References Cited

U.S. PATENT DOCUMENTS

2017/0366452 A1* 12/2017 Moisand ................. G16H 40/67
2018/0063705 A1*  3/2018 Maslak ................. H04W 40/20
2018/0249352 A1*  8/2018 Breuer .................... H04L 67/42

* cited by examiner

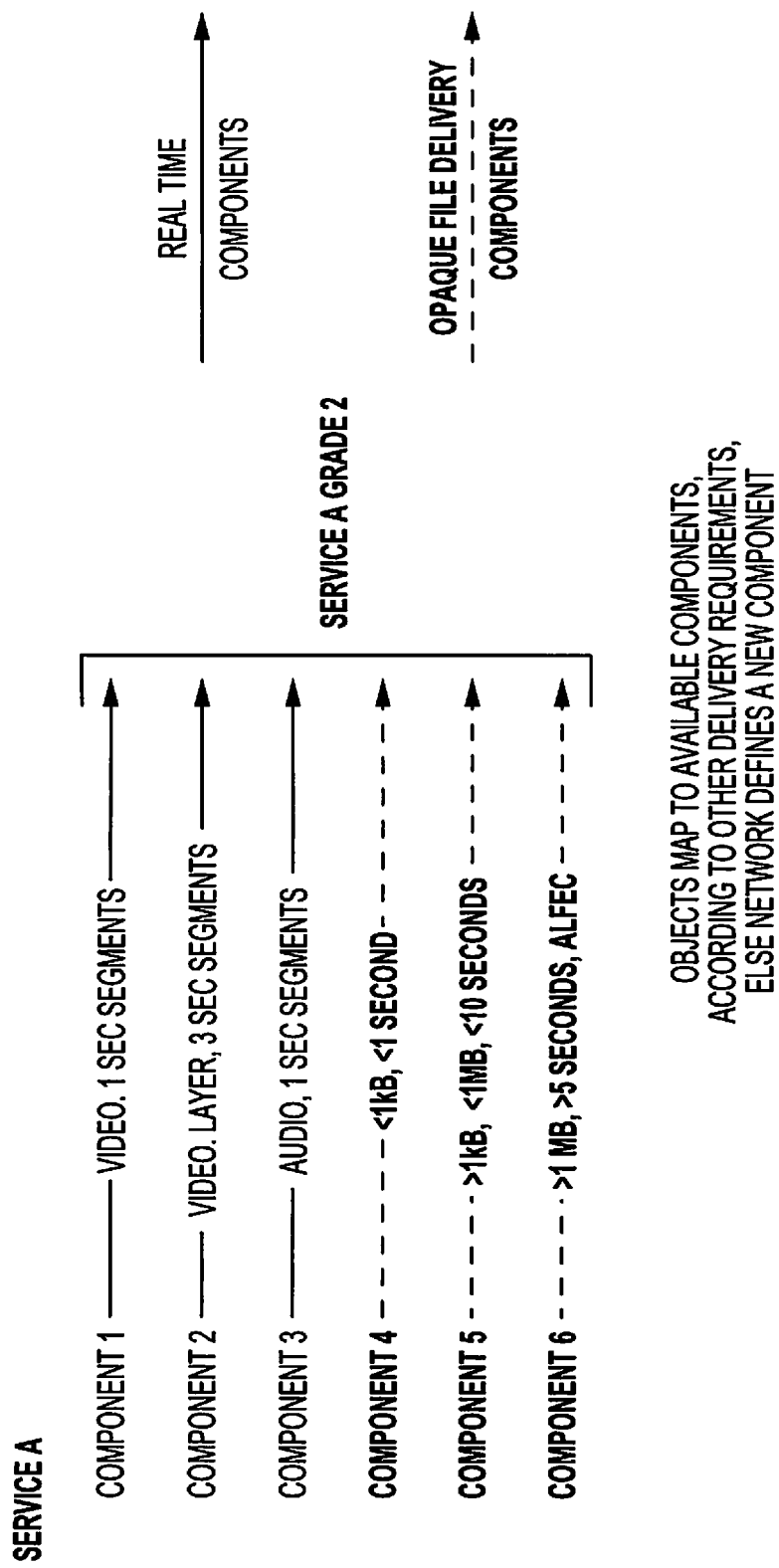

DEVICE PAIR  +  =  REQUIRED
ATTRIBUTES  *  =  OPTIONAL
    PROPAGATION MODEL
        HATA, HATA DAVIDSON, ITU-R 1546*
    HEIGHT (m) +
    ANTENNA 1
        PEAK GAIN, ELSE EFFICIENCY (NEGATIVE NUMBERS ARE EFFICIENCY) +
        FRONT TO BACK RATIO (REQUIRED FOR PEAK GAIN, ELSE PATTERN) +
    PATTERN +
     GAIN (dBi), AZIMUTH(DEG)
    DEVICE PORT 1
        LOSS (PENETRATION, CABLE) +
        NOISE FIGURE (AT ANTENNA INPUT) +
    ANTENNA N
    ...
    ...
    DEVICE PORT N
    ...
    ...

FIG. 5

SYSTEMS AND METHODS FOR OPAQUE OBJECT DELIVERY IN A COMMUNICATION NETWORK

CROSS-REFERENCE TO RELATED APPLICATIONS

This application claims the benefit of U.S. Provisional Patent Application No. 62/445,143, entitled, "SYSTEMS AND METHODS FOR OPAQUE OBJECT DELIVERY IN A COMMUNICATION NETWORK," filed on Jan. 11, 2017, the disclosure of which is hereby incorporated by reference herein in its entirety as if fully set forth below and for all applicable purposes.

FIELD

This disclosure generally relates to the providing of content to network nodes. More specifically, this disclosure relates to facilitating delivery of opaque objects provided by a content provider to network nodes within a communication network to which content is to be provided.

BACKGROUND

Various Content Providers (CPs) may provide content for consumption by user devices, such as by broadcast, multicast, and/or unicast communication via one or more networks. For example, an entity or individual originally sourcing content, such as multimedia content, may transmit streaming content to one or more user devices and thus operate as a content provider. Similarly, a Multichannel Video Programming Distributor (MVPD), such as may comprise a cable or satellite service provider, may provide redistribution of content originally broadcast over the air to one or more user devices and thus operate as a content provider. Irrespective of the particular paradigm in which a CP obtains and provides content, the CPs may utilize networks of a Mobile Network Operator (MNO) or other network operator (referred to collectively as Network Operators (NOs)) to facilitate delivery of content to a variety of users, such as may comprise customers or subscribers of the CP and/or MNO, various nodes within the MNO's network, etc.

Although the network may be configured to provide an interface to a CP through which the above mentioned content may be transmitted to various user devices of the network, the NO is generally unwilling to disclose certain proprietary information in association with the network interface to the CPs, such as the exact or detailed configuration of their network. Accordingly, although the interface provided with respect to the CP and network may comprise media and service composition description, service area selection, and description of ad slot availability, the description on the interface may not or does not need to disclose internal network architecture. For example, the interface description may comprise a written Service Level Agreement (SLA) in which the NO describes the level of service (e.g., minimum bit rate, average bit rate, and maximum bit rate) that the NO will meet within the service area of the network. That is, the interface description would provide the service and capability on offer from the NO without disclosing the network configuration or providing information regarding particulars of the users identities or user equipment of the network. Accordingly, although information regarding the network environment into which the CP is delivering content may be useful to the CP for facilitating content delivery using the network, such information or some portion thereof may not be available to the CP.

SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for providing one or more opaque objects from a content provider system to a network for delivery to network nodes is provided. The method of embodiments includes coupling the content provider system to a gateway interface configured to provide network information to the content provider system. The method of embodiments further includes providing, by the gateway interface, at least a portion of the network information to the content provider system and receiving, by the gateway interface, a delivery manifest for the one or more opaque objects provided by the content provider system, wherein the delivery manifest includes attributes defining service requirements for the one or more opaque objects, wherein at least one of the attributes is based at least in part the network information.

In another aspect of the disclosure, an apparatus configured for providing one or more opaque objects from a content provider system to a network for delivery to network nodes is provided. The apparatus of embodiments includes means for coupling the content provider system to a gateway interface configured to provide network information to the content provider system. The apparatus of embodiments further includes means for providing, by the gateway interface, at least a portion of the network information to the content provider system and means for receiving, by the gateway interface, a delivery manifest for the one or more opaque objects provided by the content provider system, wherein the delivery manifest includes attributes defining service requirements for the one or more opaque objects, wherein at least one of the attributes is based at least in part the network information.

In yet another aspect of the disclosure, a non-transitory computer-readable medium having program code recorded for providing one or more opaque objects from a content provider system to a network for delivery to network nodes is provided. The program code of embodiments includes program code executable by a computer for causing the computer to interface the content provider system to a gateway configured to provide network information to the content provider system. The program code of embodiments further includes program code executable by the computer for causing the computer to provide, by the gateway interface, at least a portion of the network information to the content provider system and receive, by the gateway interface, a delivery manifest for the one or more opaque objects provided by the content provider system, wherein the delivery manifest includes attributes defining service requirements for the one or more opaque objects, wherein at least one of the attributes is based at least in part the network information.

In still another aspect of the disclosure, an apparatus configured for providing one or more opaque objects from a content provider system to a network for delivery to network nodes is provided. The apparatus of embodiments includes a memory and at least one processor coupled to the memory. The at least one processor of embodiments is configured to interface the content provider system to a gateway configured to provide network information to the content provider system. The at least one processor of embodiments is further configured to provide, by the gateway interface, at least a portion of the network information to the content provider system and to receive, by the gateway interface, a delivery manifest for the one or more opaque objects provided by the content provider system, wherein the delivery manifest includes attributes defining service requirements for the one or more opaque objects, wherein at least one of the attributes is based at least in part the network information.

In one aspect of the disclosure, a method for establishing a service grade for delivery of one or more components of a service in the communication network is provided. The method of embodiments includes receiving, at a gateway interface from a content provider system, a service request describing service objectives for the one or more components of the service, wherein the service objectives specify device type pair coverage within a specified coverage area, and wherein the device type pair coverage of the service objectives comprises a coverage metric for a particular reception condition and device type pairing. The method of embodiments further includes defining, by the gateway interface based at least in part on the service request, a service grade for delivery of the one or more components of the service in the communication network, wherein the service grade provides specified coverage attributes for one or more coverage areas of a service area of the communication network for the one or more components of the service.

In another aspect of the disclosure, an apparatus configured for establishing a service grade for delivery of one or more components of a service in the communication network is provided. The apparatus of embodiments includes means for receiving, at a gateway interface from a content provider system, a service request describing service objectives for the one or more components of the service, wherein the service objectives specify device type pair coverage within a specified coverage area, and wherein the device type pair coverage of the service objectives comprises a coverage metric for a particular reception condition and device type pairing. The apparatus of embodiments further includes means for defining, by the gateway interface based at least in part on the service request, a service grade for delivery of the one or more components of the service in the communication network, wherein the service grade provides specified coverage attributes for one or more coverage areas of a service area of the communication network for the one or more components of the service.

In yet another aspect of the disclosure, a non-transitory computer-readable medium having program code recorded thereon for establishing a service grade for delivery of one or more components of a service in the communication network is provided. The program code of embodiments includes program code executable by a computer for causing the computer to receive, at a gateway interface from a content provider system, a service request describing service objectives for the one or more components of the service, wherein the service objectives specify device type pair coverage within a specified coverage area, and wherein the device type pair coverage of the service objectives comprises a coverage metric for a particular reception condition and device type pairing. The program code of embodiments further includes program code executable by the computer for causing the computer to define, by the gateway interface based at least in part on the service request, a service grade for delivery of the one or more components of the service in the communication network, wherein the service grade provides specified coverage attributes for one or more coverage areas of a service area of the communication network for the one or more components of the service. is provided. The program code can include code to In still another aspect of the disclosure, an apparatus configured for establishing a service grade for delivery of one or more components of a service in the communication network is provided. The apparatus of embodiments includes a memory and at least one processor coupled to the memory. The at least one processor of embodiments is configured to receive, at a gateway interface from a content provider system, a service request describing service objectives for the one or more components of the service, wherein the service objectives specify device type pair coverage within a specified coverage area, and wherein the device type pair coverage of the service objectives comprises a coverage metric for a particular reception condition and device type pairing. The at least one processor of embodiments is further configured to define, by the gateway interface based at least in part on the service request, a service grade for delivery of the one or more components of the service in the communication network, wherein the service grade provides specified coverage attributes for one or more coverage areas of a service area of the communication network for the one or more components of the service.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiments disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the disclosed system and methods, reference is now made to the following descriptions taken in conjunction with the accompanying drawings.

FIGS. 3A and 3B show services defined by collections of service components according to aspects of the present disclosure.

FIG. 5 shows an exemplary schema depiction of a device type pair description according to aspects of the present disclosure.

DETAILED DESCRIPTION

Figure 1:
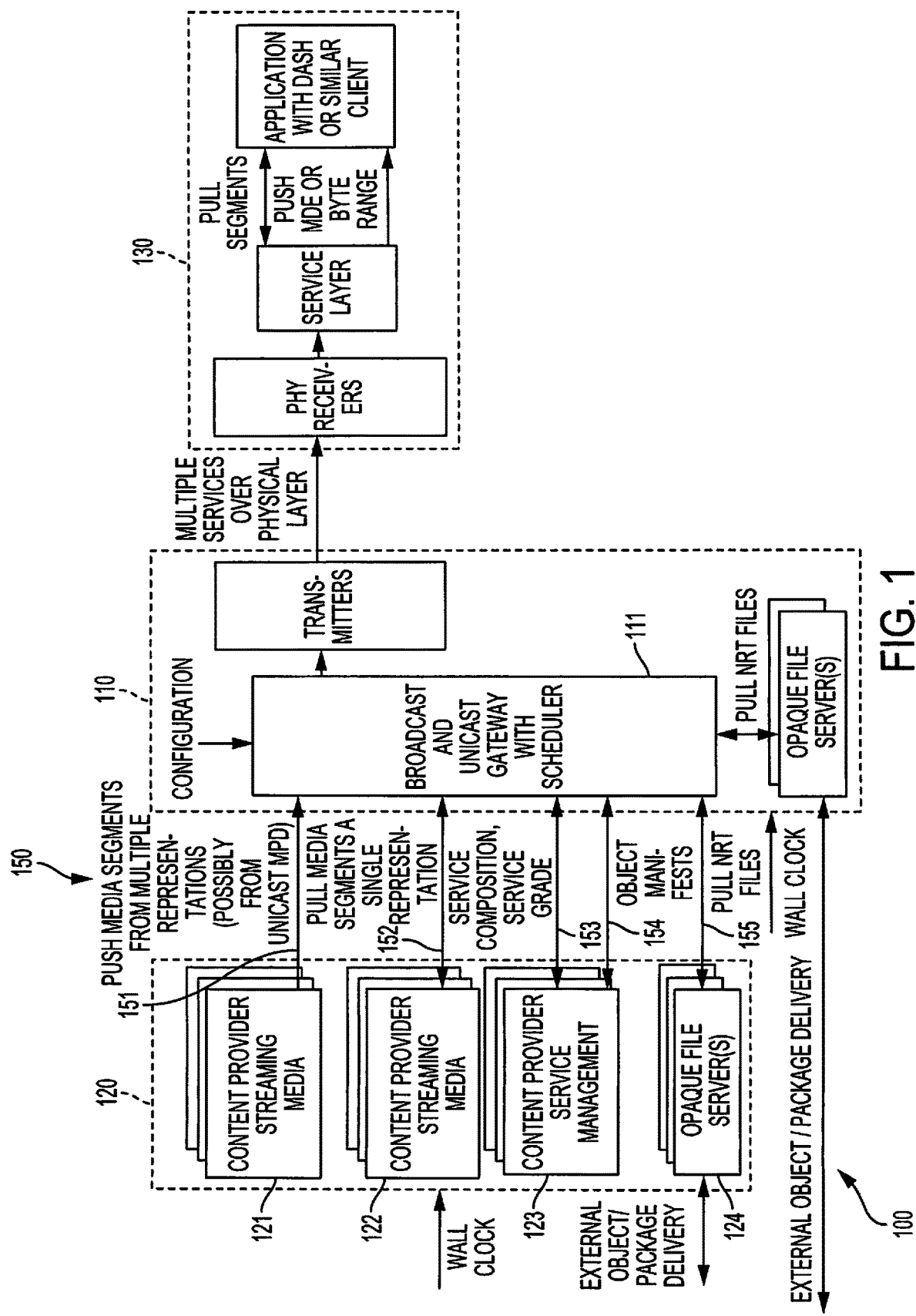
FIG. 1 shows an exemplary communication system configured according to aspects of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

As used in this description, the term "content" may include data having video, audio, combinations of video and audio, or other data at one or more quality levels, the quality level determined by bit rate, resolution, or other factors. The content may also include executable content, such as: object code, scripts, byte code, markup language files, and patches. In addition, "content" may also include files that are not executable in nature, such as documents that may need to be opened or other data files that need to be accessed.

As used in this description, the term "streaming content" refers to content that may be sent from a server device and received at a user device according to one or more standards that enable the real-time transfer of content or transfer of content over a period of time. Examples of streaming content standards include those that support de-interleaved (or multiple) channels and those that do not support de-interleaved (or multiple) channels.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

As used herein, the terms "user equipment," "user device," and "client device" include devices capable of receiving content from a server, such as, for example, a web server, and transmitting information to the server. Such devices can be stationary devices or mobile devices. The terms "user equipment," "user device," and "client device" can be used interchangeably.

As used herein, the term "user" refers to an individual receiving content on a user device or on a client device and transmitting information via the client device.

Systems and methods disclosed herein provide delivery of opaque objects provided by a content provider to network nodes within a communication network. For example, in addition to or in the alternative to delivery of streaming media content (e.g., streaming real-time (RT) and/or non-real-time (NRT) video and/or audio files), embodiments herein operate to deliver various opaque objects (e.g., content related to or associated with streaming media content, such as station logos and information supplementing streaming content, content unrelated to streaming media content, such as announcements and emergency alerts, independently transmitted content, such as programming information, subscription information, and service availability, etc.) via a communication network. Opaque objects for which delivery is facilitated according to embodiments of the disclosure may additionally or alternatively contain media (e.g., video and/or audio content) not tied to a streaming timeline.

In contrast to content provided as streaming media content that is typically transparent (i.e., content of a data type whose data structure is defined in the interface and thus is visible to the systems of the network), opaque objects herein comprise data objects whose data structure is not natively defined in the CP system to network interface and thus have a data type and/or structure that would be unknown to systems of the network without functionality provided in accordance with the concepts herein. For example, segments of streaming media provided by a CP system to the communication network for delivery to various network nodes may natively comprise delivery tags providing information for the scheduling and delivery of the segments or defined by component type (e.g., component type that carries one second segments), whereas opaque objects may not natively be tagged with or otherwise have sufficient information for the network to schedule delivery of the objects in accordance with the CP's needs or desires (e.g., although possibly tagged with destination information, opaque objects are not tagged with information regarding their delivery requirements over the network). Moreover, sufficient information regarding the network environment into which the CP is delivering content is not typically made available to the CP by the NO and thus there was previously no means by which the CP may provide supplemental information in association with opaque objects for facilitating their delivery in accordance with the CP's needs or desires using the network. Accordingly, communication systems may be configured in accordance with the concepts herein to facilitate delivery of such opaque objects, such as by providing a robust network interface between a CP system and the network through which network information (e.g., information facilitating an understanding of the network by the CP system without disclosing configuration details of the network to the CP system) is provided from the network to the CP system and/or delivery manifest information (e.g., as may be based at least in part the network information) for opaque objects is provided from the CP system to the network.

FIG. 1 shows communication system 100 configured to facilitate delivery of opaque objects provided by a content provider to network nodes within a communication network to which content is to be provided. In particular, communication system 100 of the illustrated embodiment provides a communication network in which CP system 120 provides content to user equipment 130 via network 110. The content provided CP system 120 may comprise content of one or more services (e.g., a linear service, such as television programming, audio, or similar, provided as streaming content programming channels, information feeds, etc.) including one or more components (e.g., standard definition video, high definition video, ultra-high definition video, three-dimensional video, standard quality audio, high quality audio, multi-channel audio, alternative audio channel, NRT data, etc.). Additionally or alternatively, the content may comprise one or more opaque objects (e.g., an opaque file, collections of files including one or more opaque file, etc.). Opaque objects provided according to embodiments may be provided in association with a service (e.g., one-to-one association with a service), may be provided in association with a plurality of services (e.g., one-to-N association with services), or may be provided independent of another service (e.g., delivery of one or more opaque objects may comprise the service). As will be better understood from the disclosure below, communication system 100 of embodiments herein is configured to facilitate delivery of such opaque objects without disclosing configuration details of network 110 to CP system 120.

CP system 120 of embodiments of communication system 100 may comprise one or more servers (e.g., web servers, media servers, file servers, etc.) operable to provide various services to client devices, such as user equipment 130. For example, CP system 120 may provide transmission of streaming content, such as through broadcast transmission, multicast transmission, and/or unicast transmission provided by one or more of media servers 121 and 122. Additionally or alternatively, CP system 120 of embodiments may provide transmission of various objects, such as the above mentioned opaque objects, whether in association with a service or separate from any such service. For example, one or more of media servers 121 and 122 and/or opaque file server 124 may transmit objects via push or pull on the network 150. Service management logic 123 of CP system 120 may provide operation to negotiate with network 110 for facilitating content delivery, such as to establish a service (e.g., a streaming content delivery service to one or more instances of user equipment, such as user equipment 130, operating within the coverage of network 110). Although a single CP system is shown in the illustrated embodiment of FIG. 1 for simplicity, it should be appreciated that communication system 100 may comprise a plurality of CP systems, whether having the same or different configurations as that shown, being associated with a same CP entity or different CP entities, or combinations thereof.

User equipment 130 of FIG. 1 may comprise one or more processor-based client device configurations (e.g., smart phone, computer, personal digital assistant (PDA), tablet device, media player, Internet appliance, Internet of Things (IoT) device, smart television, set-top-box, etc.) operable to receive content and/or other information as may be provided from time to time by systems such as CP system 120. Although a single user equipment instance is shown in the illustrated embodiment of FIG. 1 for simplicity, it should be appreciated that communication system 100 may comprise a plurality of user equipment instances, whether having the same or different configurations as that shown, being associated with a same user entity or different user entities, or combinations thereof.

Embodiments of user equipment 130 are configured to provide for bidirectional communication with CP systems (e.g., using one or more Internet Protocol (IP) communication links), such as to request content, to negotiate content delivery, to perform interactive functionality with respect to content delivery, to report receipt of content and/or other information, and/or the like. Accordingly, such user equipment, as may support unicast and/or broadcast content delivery, can be monitored when they are under coverage of network 110. User equipment provided in a Receive Only Modem (ROM) configuration generally utilize a broadcast feed that is guaranteed to carry service. Such ROM configured user equipment are expected to be largely fixed reception and may be connected by wired or wireless IP (e.g., in the home), although ROM configured user equipment implementing mobile reception, such as automotive ROM configured user equipment, may likewise have IP access (e.g., through the host vehicle systems or other cooperative system). Accordingly, even user equipment provided in such ROM configurations may be monitored (e.g., a URL for reporting back may be provided to the devices).

Network 110 provides communication infrastructure facilitating data communication between CP system 120 and user equipment 130 of the embodiment illustrated in FIG. 1. Network 110 may comprise various configurations of communication networks, such as provide wireless communications links, wired communication links, optical communication links, and/or combinations thereof. For example, network 110 may comprise a cellular network, a cable transmission system, a Local Area Network (LAN), a Wireless LAN (WLAN), a Metropolitan Area Network (MAN), a Wide Area Network (WAN), the Internet, the Public Switched Telephone Network (PSTN), etc. Irrespective of the particular configuration of the network infrastructure facilitating the communication links between CP system 120 and user equipment 130, the network provides a robust network interface to facilitate delivery of content from a content provider to network nodes within the communication network. In particular, the network interface provided according to embodiments is configured for delivering opaque objects provided by CP system 120 to instances of user equipment (e.g., user equipment 130). For example, the network interface provided by gateway 111 of embodiments herein is configured to enable an understanding of the network by CP system 120, without disclosing configuration details of network 110 to CP system 120, for facilitating delivery of opaque objects via network 110. Moreover, the network interface provided by gateway 111 of embodiments is configured to enable CP system 120 to provide information to network 110 to facilitate delivery of opaque objects in accordance with a CP's needs or desires, whether the opaque objects are provided in association with a service (e.g., one-to-one association with a service), provided in association with a plurality of services (e.g., one-to-N association with services), or provided independent of another service (e.g., delivery of one or more opaque objects as a service).

Gateway 111 may, for example, comprise a processor-based system disposed at the edge of network 110 operable to collect, aggregate, and/or communicate information regarding the area(s) that can be covered and information regarding the nature of the coverage provided, such as may comprise information regarding the currently available and reachable receivers within one or more areas served by network 110, for providing to CP systems (e.g., CP system 120) in communication therewith. It should be appreciated that logic of gateway 111 may provide operation to collect, aggregate, and/or communicate such information. Additionally or alternatively, logic of gateway 111 may operate in cooperation with components external thereto, such as functionality of infrastructure of network 110 (e.g., logic of base stations, routers, switches, etc.), logic of a client application executed by user equipment (e.g., user equipment 130), and/or the like. Embodiments of gateway 111 may, for example, run over various protocols, such as Hypertext Transfer Protocol (HTTP) and/or HTTP over Secure Sockets Layer (HTTPS).

As shown in the embodiment of FIG. 1, network interface 150 provided by gateway 111 of embodiments may facilitate communication of content (e.g., information flows 151 and 152, such as may comprise streaming content having including one or more components) from CP system 120 (e.g., by media servers 121 and 122) to various user equipment (e.g., user equipment 130) in communication with network 110. Network interface 150 provided by gateway 111 of embodiments herein additionally or alternatively facilitates communication of various network information (e.g., information flow 153, such as may comprise information regarding the area(s) that can be covered, information regarding the nature of the coverage provided, etc.) from network 110 to CP system 120 to facilitate delivery of opaque objects (e.g., information flow 155, such as may comprise opaque objects from opaque file server 124) provided by the content provider to network nodes. For example, in operation of network interface 150 of embodiments, the NO may disclose information regarding the area(s) that can be covered (referred to herein as service area information) and information regarding the nature of the coverage provided (referred to herein as coverage nature information) to CP system 120. Coverage nature information provided according to embodiments of the disclosure may comprise information regarding various coverage attributes, information regarding the currently available and reachable receivers (referred to herein as service population characteristic information), etc.

Figure 2:
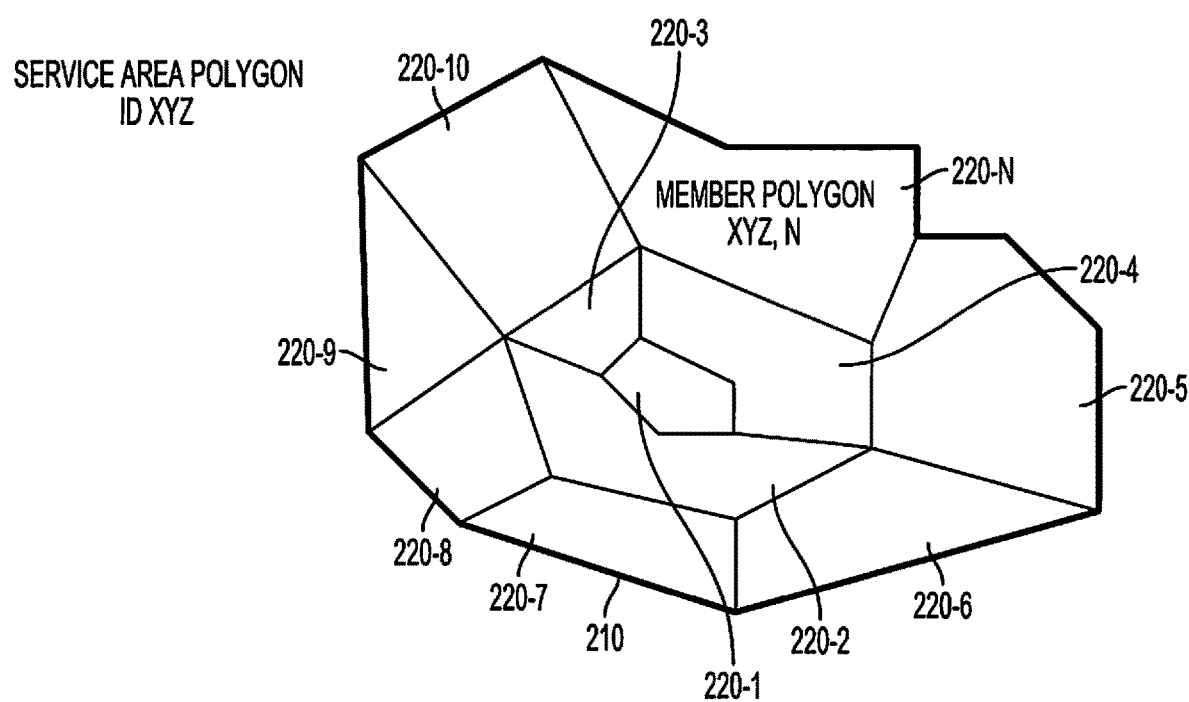
FIG. 2 shows an example of polygons as may be utilized to provide descriptions of covered areas according to aspects of the present disclosure.

Service area information provided via network interface 150 of embodiments of the present disclosure to facilitate delivery of opaque objects may comprise information providing descriptions of covered areas by means of, for example, a series of polygons. FIG. 2 shows an example of polygons as may be utilized to provide descriptions of covered areas according to some embodiments. In particular, the exemplary embodiment of FIG. 2 provides a covered area (e.g., a portion of a service area of network 110) description comprising service area polygon 210 and member polygons 220-1 through 220-N. The individual member polygons may, for example, be identified by a member polygon ID. Similarly, the service area polygon corresponding to the service area of one or more member polygons may be identified by a service area polygon ID. In the service area information as may be provided via network interface 150 the outline of each of the foregoing polygons may be described by a series of points, such as may be defined by latitude and longitude pairs. The description of an individual member polygon may, for example, be provided as an XML document or portion thereof, such as may include the member polygon coverage area and member polygon ID. The description of a service area polygon (i.e., the outer boundary of a service area comprising one or more member polygons) may be provided as an XML document or portion thereof, such as may include a list of the member polygons (and possibly the member polygon coverage areas) and service area polygon ID.

Each of the member polygons of embodiments has a set of attributes that may be provided to the CP system in association with the polygon descriptions. Accordingly, coverage nature information provided to facilitate delivery of opaque objects herein may comprise information providing coverage attributes for member polygons. The coverage attributes of embodiments describes, in general terms, device type pairs in terms of reception condition and device types. As a specific example, coverage attributes may comprise service grades, described more fully below, specifying the percentage coverage area of a particular coverage type (e.g., indoor suburban/mobile, outdoor suburban/mobile, indoor suburban/fixed, indoor rural/fixed, outdoor rural/mobile, roof top/fixed, roof top/automotive, indoor urban/mobile, etc.) at a specific coverage grade (e.g., average bit rate, minimum/maximum bit rate, etc.). The coverage attributes of embodiments may comprise one or more coverage metric for the particular reception condition and the device type pairing may, for example, provide information regarding a sensitivity of minimum field strength with respect to the particular reception condition and device type pairing.

Attributes of coverage nature information provided to the CP in association with the polygon descriptions of service area information of embodiments may additionally or alternatively include service population characteristic information. Service population characteristic information of embodiments includes attributes such as the number of known devices present in a polygon by device type pair, the number of devices active on a specific service by device type pair, demographic membership (e.g., according to CP definition) by device type pair, and/or known or predicted user behavior (e.g., from user profile, viewing or purchasing history, etc.) associated with active devices on specific service. For example, the service population characteristic information of embodiments includes the numbers and types of the currently reachable receivers, devices, and/or other user equipment (e.g., reachable user equipment having data connectivity and capable of taking and reporting an ad if one were delivered). The service population characteristic information may further include the numbers and types of the potential receivers, devices, and/or other user equipment (e.g., user equipment currently present on a specific service although perhaps not currently engaging in connectivity to report an ad if one were delivered). Service population characteristic information of embodiments may additionally or alternatively include information of a demographic nature for the user equipment or users thereof. It should be appreciated that, in providing coverage nature information and service population characteristic information in accordance with embodiments herein, the exact identity of the user equipment instances need not be disclosed to the CP system, but rather a collection of their attributes are disclosed. Accordingly, although the network knows or may know the unique identity of the unicast connected devices, for example, this information is not disclosed to the CP system or need not be known according to embodiments of the present disclosure.

Receivers (e.g., user equipment 130) may be broken down for classification according to embodiments of the disclosure into reception condition (e.g., antenna and position, there generally being one defined antenna per active port) and device type (e.g., equipment configuration). As a specific example, a device type pair may be described as "roof top directional" (e.g., as may be known or assumed to provide at least 10 dBd gain, 16 dB front to back ratio antenna, and 10 m height) and a "fixed receiver" (e.g., as may be defined by an effective noise figure and number of available ports). Accordingly, device type pairs of embodiments comprise a collection of attributes for each of the reception condition and device type.

Figure 3A:
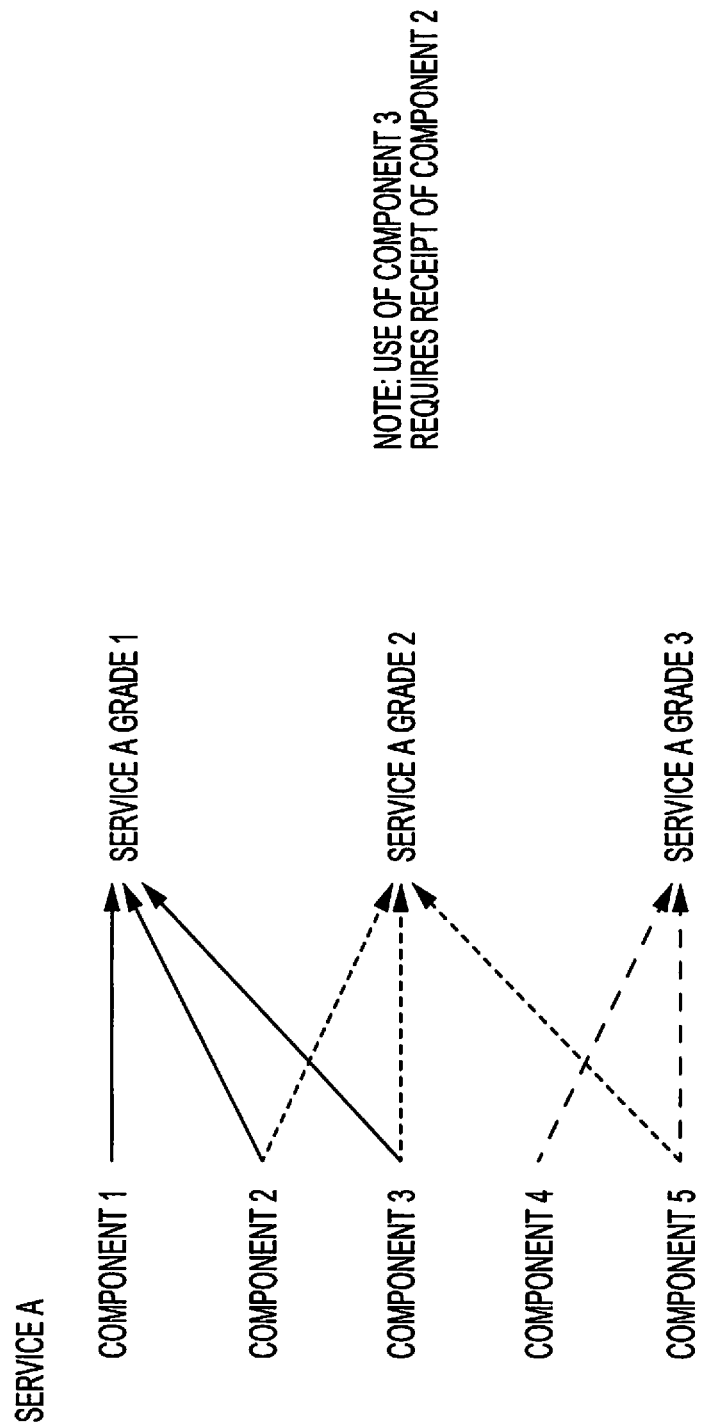

A service may be defined by a collection of service components (e.g., Service A of FIG. 3A defined by Components 1-5 and Service A of FIG. 3B defined by Components 1-6), wherein one or more service components might not be delivered for all combinations of reception conditions and device types (e.g., Components 1-3 of Service A may be delivered for a first combination of reception condition and device type, Components 2, 3, and 5 of Service A may be delivered for a second combination of reception condition and device type, and Components 4 and 5 of Service A may be delivered for a third combination of reception condition and device type) and some components may require the reception of another component (e.g., use of Component 3 of Service A may require receipt of Component 2). The components of a service of embodiments of the present disclosure may comprise streaming delivery components (e.g., Components 1-3 of FIG. 3B shown as RT components) and/or opaque delivery components (e.g., Components 4-6 of FIG. 3B shown as opaque file delivery components).

A service grade of the network information, providing coverage attributes for member polygons, comprises a set of components that apply to a specific service description for a device type pair (i.e., reception condition and device type). Moreover, a service grade of embodiments can be used to express relationships of various components of a service, such as where there are layered components (e.g., components requiring the reception of another component) within a service (e.g., if a component is dependent on another component for render it may be stated in the service definition). A service grade may, for example, be expressed as a XML document in an http or https transaction with the CP system. The service grade of embodiments may be represented by an N dimensional vector and may be defined differently for various reception conditions and device types.

A service grade attribute of embodiments may describe, in general terms, coverage within one or more member polygons for one or more device type pairs. A service grade of embodiments may, for example, describe specified device type pair coverage within particular member polygons for a set of components that apply to a specific service description. For example, in an embodiment of FIG. 3A, Service A Grades 1-4 may each specify the percentage coverage area of particular coverage types at specific coverage grades with respect to the corresponding set of components (e.g., Service A Grade 1 comprises Components 1-3 of Service A and provides specified coverage attributes for a first one or more device type pairs in a first identified one or more member polygons, Service A Grade 2 comprises Components 2, 3, and 5 of Service A and provides specified coverage attributes for a second one or more device type pairs in a second identified one or more member polygons, and Service A Grade 3 comprises Components 4 and 5 of Service A and provides specified coverage attributes for a third one or more device type pairs in a third identified one or more member polygons). Accordingly, a service grade of embodiments has various characteristics, some of which correspond to those previously described for a service, such as geographically known coverage area(s), a target device usage model (e.g. indoor suburban) and device type (e.g. smartphone), the number of known devices present in a service area (e.g., member polygon) by type, the number of devices active on a specific service by type, demographic membership according to CP definition by device type, known or predicted user behavior (e.g., from user profile, viewing or purchasing history, etc. associated with active devices on specific service and/or service grade), etc. As an example, a service grade may specify the percentage coverage area of a particular device type pair (e.g., indoor suburban/mobile, outdoor suburban/mobile, indoor suburban/fixed, indoor rural/fixed, outdoor rural/mobile, roof top/fixed, roof top/automotive, indoor urban/mobile, etc.) at a specific coverage grade (e.g., average bit rate, minimum/maximum bit rate, etc.).

It should be noted that the coverage for a service grade comprises reception of all included components in the specific grade. This does not, however, require that a device receive all components in order to render service. Accordingly, the service grade definition of embodiments may include some minimum set of components required to produce the service grade. However, there is no restriction on a device staying only with its service grade according to embodiments. Components may be marked as alternates (e.g., lower bit rate, more robust transmissions, etc.) to other components (e.g., high bit rate, less robust transmissions, etc.) to facilitate delivery of content where one or more components of a particular service grade may not be deliverable.

It should be noted that only the full duplex receivers can be monitored. The receive only modems must utilize a broadcast feed that is guaranteed to carry service.

Figure 4:
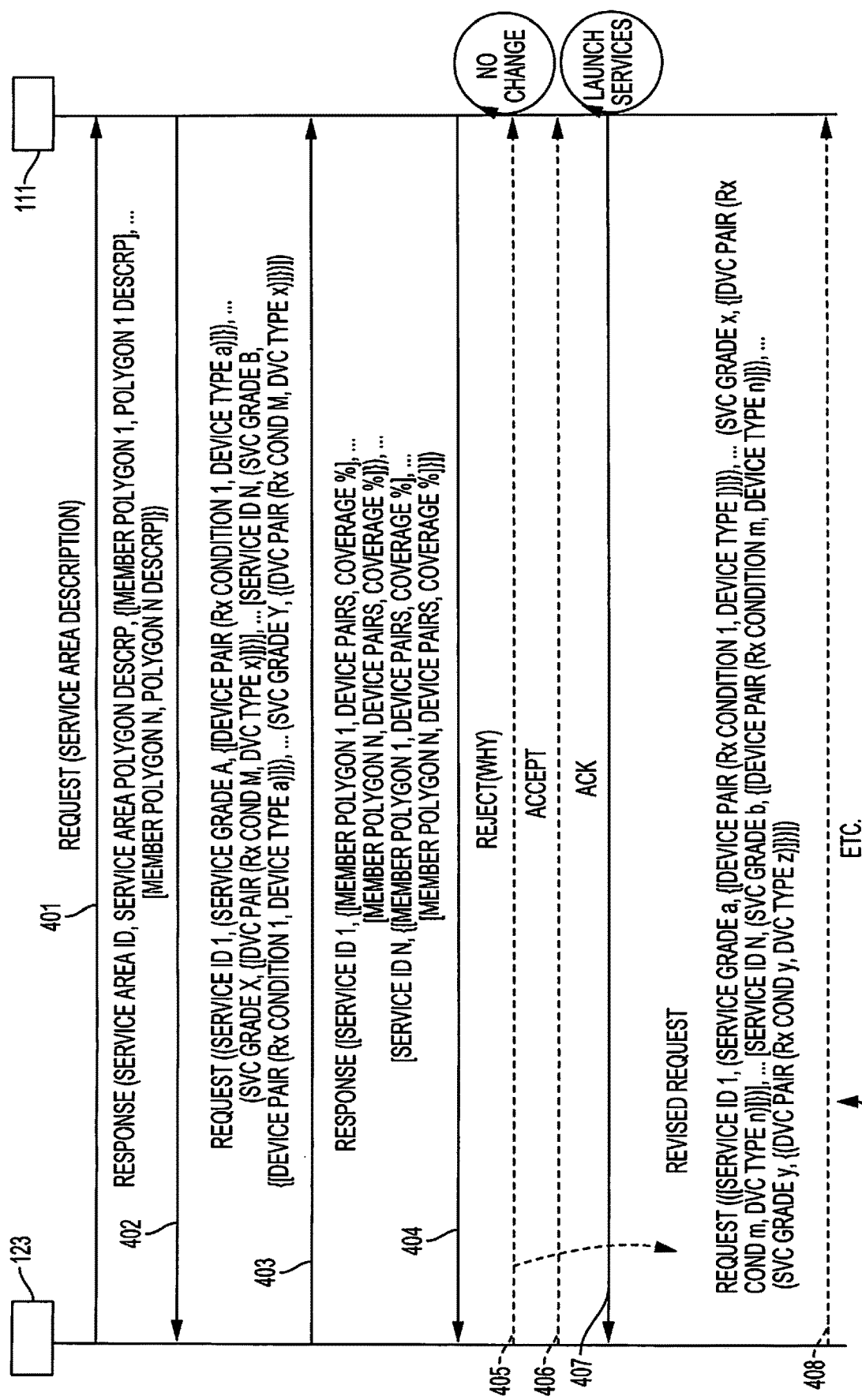
FIG. 4 shows exemplary operation for negotiating service and service grades according to aspects of the present disclosure.

Services and service grades can be negotiated between CP system 120 and gateway 111 of network 110 in operation according to embodiments herein. FIG. 4 illustrates exemplary operation whereby CP system 120 and gateway 111 interact to establish services and service grades. The data exchanges of FIG. 4 may, for example, be implemented as part of data flow 153 (FIG. 1). In the data exchanges of the embodiment illustrated in FIG. 4, the coverage area is made known and the coverage per service grade defined as described for service. The network information obtained by CP system 120 may, for example, be provided in one or more XML document (e.g., comprising service area information, coverage nature information, and/or service population characteristic information, such as in the form of the above described service area polygon coverage area information, member polygon coverage area information, and/or member polygon attribute information) of data flow 153 to CP system 120.

FIG. 4 illustrate example data exchanges between service management logic 123 of CP system 120 and gateway 111 of network 110 in which CP system 120 is operable to negotiate with network 110 to establish a service (e.g., a streaming content delivery service to one or more instances of user equipment, such as user equipment 130, operating within the coverage of network 110). The data exchange of FIG. 4 illustrates a general architecture for service negotiation in which network data is provided to the CP system. The limits of the negotiation may, for example, be constrained by an SLA, which may be enforced on the network interface of embodiments herein. It should be appreciated that, although the exemplary data exchanges of FIG. 4 illustrate a general architecture, various specific architectures (e.g., data exchange based on the RESTful architecture and conducted via HTTP transactions) may be utilized according to embodiments.

The service negotiation data exchanges of the exemplary data flows of FIG. 4 begins with CP system 120 initiating a request for a service area description (data exchange 401). In response, network 110 provides a service area response, such as may comprise the above described service area information and/or coverage nature information, to CP system 120 (data exchange 402).

The service negotiation data exchanges of the exemplary data flows of FIG. 4 provides a service request from CP system 120 to network 110 (data exchange 403) in which the CP system specifies one or more attributes with respect to the service to be provided. In operation according to embodiments of the present disclosure, the service request message of embodiments may include, for each service, the corresponding service grade objective (e.g., comprising metrics such as average throughput and transmission delay through the network, and may differ by the content components of the service), the targeted device type pair information (e.g., comprising one or more pairings of reception condition information, such as rooftop, mobile, indoor, etc., and device type, such as fixed, automotive-installed, mobile, etc.). FIG. 5 shows an exemplary device type pair description document, including propagation model attributes, antenna attributes, and device port attributes, as may be utilized according to embodiments of the disclosure. The CP system may, for example, provide a description of a service which contains a number of service components in the service request. The definition of service for a given device type pair may, for example, comprise a subset of the all the service components in the service, and the CP system may provide a description of each service according to included service components and service grade per service component. However, in operation according to embodiments, a single service grade maybe applicable to all service components. For example, if service grade information is not signaled per service component in the service request then all service components may be included in the one service grade. CP system 120 (e.g., through operation of service management logic 123) of embodiments may utilize the network information provided in the service area response message to determine one or more attributes of the service to be provided, such as the service grade, the user equipment and/or member areas to be provided the service, etc., wherein one or more determined attributes may be included in the service request.

In operation according to the service negotiation data exchanges of the exemplary data flows of FIG. 4, a service offer message (data exchange 404) may be provided to CP system 120 by network 110 in response to the service request message. A service offer message may, for example, contain the offered (i.e., supportable) capabilities by the network for the previously requested service from the CP system. For each service, the service offer message of embodiments may provide information such as the available service reception area as defined by a member polygon, the corresponding device type pair information for the available service reception, the percentage coverage area within the polygon which meets the desired service grade for that service, etc.

It should be appreciated that the network may or may not be able to meet the particulars of the service request made by the CP system, such as may be communicated by the network to the CP system using the foregoing service offer message (e.g., data exchange 403) and/or via separate data exchanges (e.g., data exchange 407 to indicate the ability to meet the service request). Where the network is able to meet the particulars of the service request, the service offer may provide information consistent with that of the service request message issued by the CP system, such as to confirm that the various attributes of the service request that will be met, wherein the service offer may be accepted by the CP system (e.g., data exchange 406) and/or the service initiated (e.g., implementing service launch operation of data exchange, such as initiation of content delivery by the CP system, such as via one or more of data flows 151 and 152). However, where the network is able to meet the particulars of the service request, embodiments may operate to omit providing a service offer message (e.g., to reduce bandwidth utilized by data flow 153), such as to instead proceed to launching the service (e.g., providing the acknowledgment message of data exchange 407 followed by content delivery by the CP system via one or more of data flows 151 and 152).

Where, however, the network is unable to meet the particulars of the service request, this inability may be communicated by the network to the CP system in various ways. For example, one or more service components might not be deliverable for all combinations of reception condition and device types (e.g., a personal mobile device may take a maximum of standard definition video as compared to high definition to fixed roof top receivers). Accordingly, an indication that the service request or some portion thereof is not acceptable to the network, possibly including information regarding a reason for the unacceptability, may be provided to the CP system. Additionally or alternatively, the inability to meet the particulars of the service request may be communicated using a service offer (e.g., data exchange 403) of embodiments herein. For example, the service offer may provide information that is inconsistent with that of the service request message issued by the CP system. Accordingly, a service offer of embodiments herein may comprise information regarding attributes with respect to the service that the network is able to support, wherein one or more of the attributes may differ from one or more corresponding attributes of the service request. The service offer of embodiments may thus be a response from the network with respect to a service or service grade request which contains a suggestion with respect to a service or service grade that the network can accommodate (e.g., an average rate, component descriptions, etc. at a certain coverage, possibly requested by the CP system). The suggestion may be expressed with the same XML description utilized by the CP returned with Network suggestions/revisions. In operation according to embodiments of the disclosure, CP system 120 (e.g., through operation of service management logic 123) may utilize information provided in the service offer message to determine if a suitable service may nevertheless be initiated. If it is determined that a suitable service is not available to be initiated, the service offer may be rejected by the CP system (e.g., data exchange 405). However, if it is determined that a suitable service is available to be initiated, the CP system of embodiments may initiate a revised service request consistent with the service offer may be provided (e.g., data exchange 408), whereby the service may be initiated (e.g., implementing service launch operation of data exchange and/or initiation of content delivery by the CP system, such as via one or more of data flows 151 and 152).

It should be appreciated that the data format of service request messages of embodiments herein may be the same as between the service request message provided in the initial request of data exchange 403 and the service request message provided in the subsequent request of data exchange 408. That is, the CP system of the embodiments illustrated in FIG. 4 is requesting the same properties for the delivery of its services over the network, with the difference between the two requests being the initial request represents the service request message prior to knowing what the network can support, and the subsequent request represents a the service request consistent with the available capabilities indicated by the network.

Figure 6:
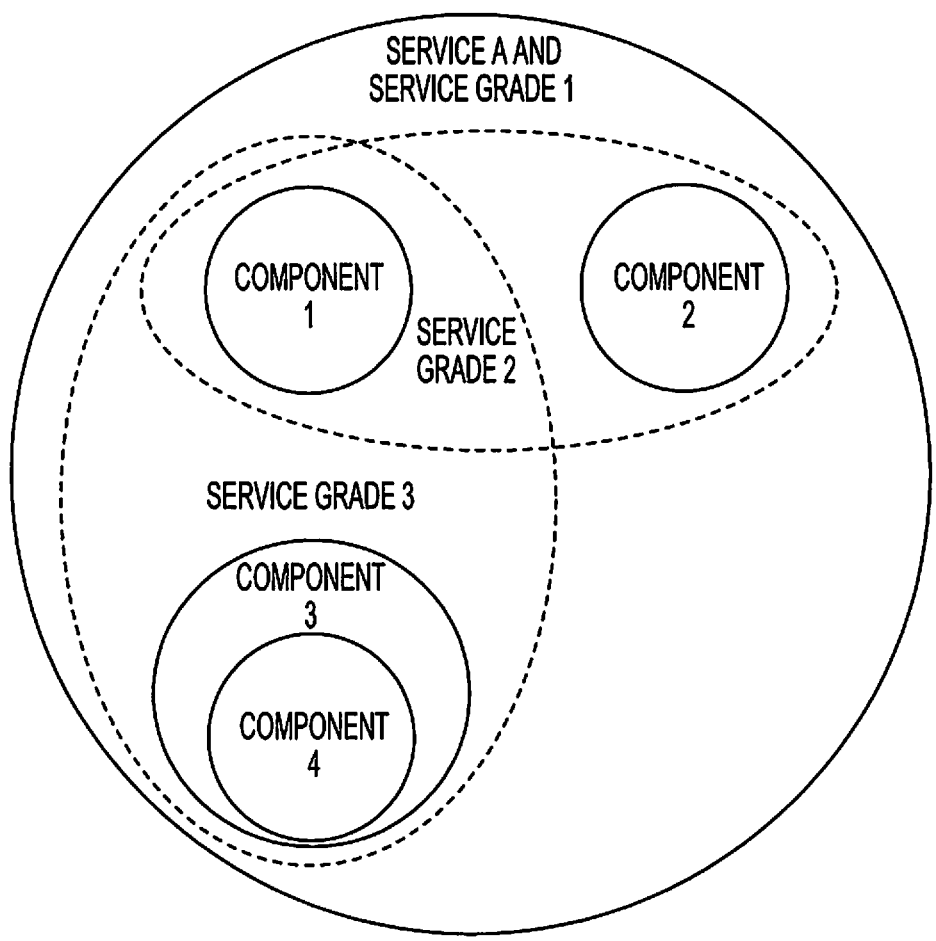
FIG. 6 shows how various components of a service and service grade may be related according to aspects of the present disclosure.

FIG. 6 illustrates how the various components of a service and service grade, as negotiated between CP system 120 and gateway 110 in operation of the data flows of FIG. 4, may be related. As shown in FIG. 6, the network has defined services (e.g., Service A) that have components (e.g., Components 1-4), wherein these components may have selective membership for a given service grade (e.g., Service Grades 1-3). In the example of FIG. 6, a service description identified as Service A includes a plurality of components, shown as Components 1-4, wherein Components 3 and 4 comprise layered components (e.g., Component 3 requires reception of Component 4). Service A of the illustrated embodiment is associated with a plurality of service grades, shown as Service Grades 1-3, wherein each such service grade defines coverage attributes of one or more member polygons in which the corresponding components are to be provided (e.g., sets of components that apply to a specific service description for coverage of device type pairs of member polygons). As can be appreciated from the example of FIG. 6, one or more service components (e.g., Components 2-4) might not be delivered for all combinations of reception condition and device types, and this relationship is expressed via service grade (e.g., Service Grade 2 for Components 1 and 2 and Service Grade 3 for Components 1, 3, and 4).

In addition to or in the alternative to providing one or more services, such as the above mentioned linear services, such as television programming, audio, or similar, that may be provided as streaming content, the CP and/or NO may have a need to execute various opaque object delivery use cases (e.g., as may be applicable individually or collectively) wherein opaque packages (e.g., an opaque package references one or files to be delivered) are delivered via the network. Such use cases may, for example, include situations in which: (1) A package is delivered to target devices before a certain time (e.g., a time limit for opaque object delivery); (2) A package is not available before a certain time on target device (e.g., access to an opaque object is to be prevented until a designated time); (3) The description of a future package or class of package is available prior to the package itself (e.g., some metadata for an opaque object is available, such as may be used for job scheduling prior to the opaque object being available); (4) The package size is known specifically prior to the scheduling of delivery by the network (e.g., detailed metadata, including file size, for an opaque object is available, such as may be used for job scheduling prior to the opaque object being available); (5) The package size range is known prior to provisional scheduling of delivery by the network (e.g., some metadata, including file size range, for an opaque object is available, such as may be used for job scheduling prior to facilitate job scheduling prior to the opaque object being available); (6) A package has a specific relationship to a service that has multiple component types (e.g., an opaque object has a relationship to streaming video, audio, and/or NRT data); (7) A package has a defined probability of delivery to a given geographic area and service grade (e.g., 95% delivery of an opaque object to one or more device types within a defined geographic area); (8) A package contains an application that has a tight temporal relation to a streaming media random access point (RAP) (e.g., an application is delivered which plays associated the media components, such as where an opaque object is part of a page in a browser and the browser page which contains JAVA script should be present at the same time as the content); (9) A package contains service metadata, which has tight timing relationship to media RAP for the related service (e.g., an opaque object comprises service metadata, such as discovery data having a timing relationship with one or more component of the service); (10) A package contains objects that are signed (e.g., an opaque object is an executable that is signed); (11) A package contains objects that are not signed (e.g., an opaque object is a non-executable file that is not signed); (12) A package is signed at the top level (e.g., an opaque package of bundled objects, one or more of which may be signed in addition to the top level package being signed); (13) A package is not signed at the top level (e.g., an opaque package of bundled objects, one or more of which may be signed although the top level package is not signed); (14) A package is targeted to devices with and without application layer forward error correction (AL-FEC) implemented (e.g., delivery of an opaque package is to be structured for receivers without AL-FEC); (15) A package may be delivered with a required frequency in time (e.g., an opaque object is to be delivered once per half hour); (16) A package is delivered within a targeted time range (e.g., an opaque is to be delivered within a specified time range); (17) A package is known by a URL or URI (e.g., an opaque package of bundled objects is known by a URL or URI reference to it); (18) Each of the objects within a package are known by a URL or URI (e.g., an opaque object is known by a URL or URI reference to it); (19) URL or URIs may be constructed such that a directory structure in the target device is disclosed (e.g., a directory structure for the target device is put into a URL or URI); and (20) The utilized URLs may be relative to Content Provider or Network (e.g., URLs may contain a common prefix to indicate they are a CP or network URL).

For each unique opaque object, or opaque package of objects, there may be a set of delivery requirements, which can have a delivery manifest defining the service requirements for this package. These attributes may include probability of success, delivery areas, streaming media service relationships, target device types, time of delivery, etc. Accordingly, in supporting various opaque object delivery use cases executed by a CP and/or NO wherein opaque packages are delivered via the network, the CP (the package flow being assumed to be from CP system to the network, wherein delivery may be via push or pull on the network) may, for example, have one or more of the following types of delivery manifest attributes for a package: Probability within a specific geographic areas, according to device type and reception conditions utilizing network defined geographic areas, such as using the above described member polygons (e.g., use cases 6, 7); Exact package size (e.g., use case 4); Package size range (e.g., use case 5); Package latest delivery time (e.g. use case 1); Package earliest delivery start time (e.g., use case 2); Package earliest availability on the CP system (e.g., use case 2); Package earliest availability on the network server (e.g., use case 2); Package earliest availability on target devices (e.g., use case 2); Package has a membership to a specific service(s) (e.g., use cases 6, 7, 9); Package has a membership in service grade(s) for specific service(s) (e.g., opaque object one-to-one or one-to-N association with services); The package is part of a service RAP for a streaming service, such as where an opaque object is distributed with service metadata synchronized or slightly ahead of media stream access point (SAP) (e.g., use cases 6,8); The package may be delivered on some pattern of system RAPs, such as 1:1 or 1 of 3 (e.g., use cases 6,8); Package delivery may or may not utilize AL-FEC (e.g., use case 12); Package has a defined maximum allowed delivery duration; The package is signed (e.g., use case 12); The package has a required repetition rate per unit time, such as once every 30 minutes (e.g., use case 15); The delivery method may be specified as unicast only, broadcast only, or either; The delivery service model may be push or pull on the CP to the network interface; The location of a package on the CP system can be defined via URL or URI (e.g., use cases 17, 18); The construction of the CP URL can have systematic construction, such as accessible with a relative URL or URI (e.g., use case 20); Package location on the network side may be known by URL or URI (e.g., use case 18); and The construction of the network side URL may have systematic construction, such as accessible with a relative URL (e.g., use case 20). As can be appreciated from the foregoing, various delivery manifest attributes of a package delivery manifest of embodiments may be based at least in part on network information (e.g., service grade information, service area information, and/or coverage nature information).

As evident from the foregoing exemplary use cases and delivery requirements, opaque objects provided according to embodiments of the present disclosure may be provided in association with a service (e.g., one-to-one association with a service or one-to-N association with services). The components of a service grade and service, as negotiated between CP system 120 and gateway 110 in operation of the data flows of FIG. 4, may include one or more opaque objects (e.g., any or all of Service Grades 1-3 of FIG. 6 may include one or more opaque objects in addition to the various components shown therein).

Figure 7:
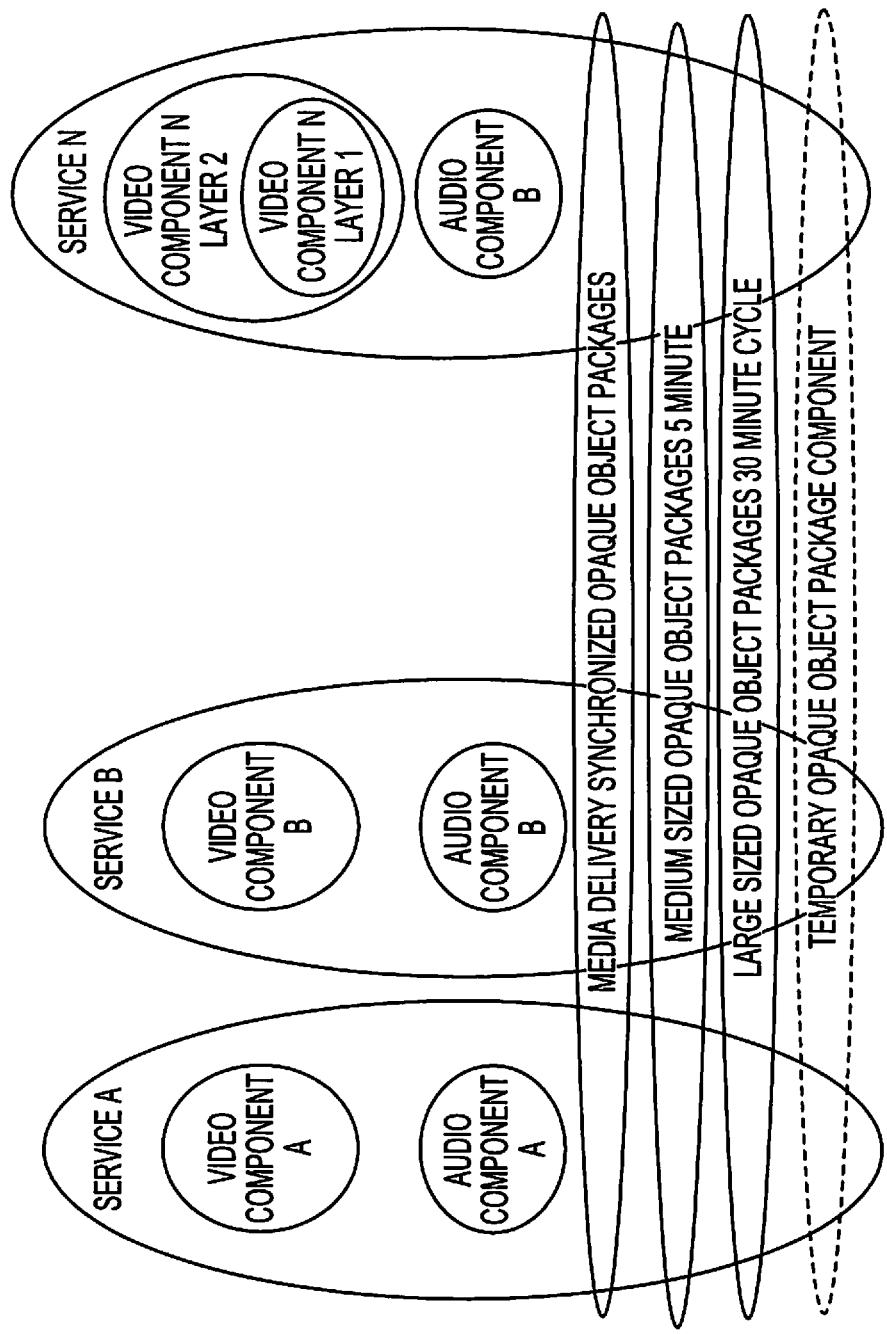
FIG. 7 shows how opaque package delivery may be related to services wherein opaque objects have a one-to-N association with services according to aspects of the present disclosure.

Although the media components (e.g., video components and audio components) of a service or service grade often have a one to one correspondence with the service, the delivery of opaque objects herein is not necessarily bound to an individual service grade or service. FIG. 7 shows how opaque package (e.g., packages of one or more opaque objects) delivery may be related to services wherein opaque objects have a one-to-N association with services. Each of Services A-N shown in FIG. 7 may, for example, be negotiated between CP system 120 and gateway 110 in accordance with the data flows of FIG. 4, wherein the illustrated opaque objects may comprise components of the negotiated services. For example, a service grade as negotiated between the CP system and network may contain delivery of opaque packages (i.e., objects or collections of objects), which are part of a service. The delivery of such objects may be dependent on a variety of aspects related to the package attributes. The network may set up a number of delivery methods that are appropriate to a certain set of delivery attributes, wherein these methods may be linked to multiple services. It should be appreciated that, in the example of FIG. 7, different classes of delivery of opaque packages may share a delivery asset.

In operation according to embodiments, CP system 120 describes one or more service grades in a service request to the network which are comprised of components from a service, wherein the binding of a service grade to a service is that they share one or more service areas and likely various components (e.g., audio components, video components, opaque object components, etc.). For example, the coverage areas for a service grade may be described in the same manner as the service, such as according to the member polygons of embodiments herein.

The component delivery may be constructed according to embodiments of the present disclosure to optimize delivery of the size and required temporal characteristics of the to be delivered opaque objects. Accordingly, the CP system may use a delivery manifest of embodiments herein to describe the service requirements for one or more opaque packages. For example, a package delivery manifest may be included in a service request when an opaque package is to be a component of the service. Accordingly, the CP system of embodiments can request opaque file delivery as a component of a service.

It should be appreciated that the particular opaque object(s) to be delivered, or all the attributes relevant to their desired delivery, may not be known when a service and/or service grade is initiated (e.g., using the above described negotiation between a CP system and network). Accordingly, embodiments provide for a generic package delivery manifest (e.g., an XML or other format manifest for general object package delivery), such as may be used by a CP system in a service request. A generic package delivery manifest service request may, for example, generally describe delivery requirements for an opaque package, such as by a size range (e.g., package size range), delivery duration (e.g., maximum delivery duration), AL FEC restrictions (e.g., using AL FEC or not), desired coverage (e.g., target coverage according to one or more service grades and member polygons), and/or time alignment (e.g., time alignment to a RAP for a specific service, skipped RAPs, such as once per three streaming media RAPs, etc.). As discussed above with respect to the service negotiation data flows of FIG. 4, the network can return a suggestion which modifies some parameters in order to satisfy others.

Irrespective of whether the attributes of an initial package delivery manifest or of a modified package delivery manifest (e.g., provided in response to the aforementioned network suggestion) are accepted, one or more opaque file delivery components (e.g., one or more opaque file delivery components in a particular service or one or more opaque file delivery components in a plurality of services) results from operation according to embodiments. For example, an opaque file delivery component has a set of defined attributes, such as range of file size and minimum delivery duration. The embodiment illustrated in FIG. 3B shows Service A defined to include a plurality of opaque file delivery components, shown as Components 4-6. For example, Component 4 may provide an opaque file delivery component for smallish files (e.g., range of metadata or launch page size(s), such as less than 1 kB, for rendering in less than 1 second from submit time) synchronized to media RAP, Component 5 may provide an opaque file delivery component for mid-sized files (e.g., files from 1 kB to less than 10 MB for rendering in less than 10 seconds from submit time, and Component 6 may provide an opaque file delivery component for largish opaque packages (e.g., files from 10 MB and greater for rendering in greater than 5 seconds from submit time and targeted to devices with AL-FEC implemented) for rendering in less than 30 minutes from submit time. In operation, when there is an opaque object that fits this general description, although perhaps having other/additional attributes, the network may accept the opaque object with its general attributes and use the appropriate defined component to deliver the opaque object, possibly with further details/delivery requirements. As can be appreciated from the foregoing, a general package delivery manifest of embodiments herein may be utilized to setup a delivery method establishing that the network is able to handle a general kind of opaque object (e.g., setting up the service and service grades capable of accommodating opaque objects having the identified delivery requirements), rather than establishing delivery for a particular opaque object.

Embodiments of a delivery manifest, such as a general package delivery manifest, include a component ID or similar information. Such information may be utilized to declare that an opaque object runs in the identified component.

The attributes relevant to the desired delivery of opaque objects may be known to the CP system, such as when the particular opaque object(s) to be delivered are available. Accordingly, embodiments additionally or alternatively provide for a specific package delivery manifest (e.g., an XML or other format manifest for a specific object package delivery), such as may be used by a CP system in a service request. A specific package delivery manifest service request may, for example, fully describe delivery requirements for an opaque package. For example, a specific package delivery manifest, in addition to including some or all of the general delivery requirement attributes of a general package delivery manifest, may include particularized delivery requirement attributes, such as specific package availability time to the Network, latest delivery time to targeted service grades, required number of repetitions, delivery completion time per repetition (e.g., top of the hour), package URI or URL and base URL, if relevant, and/or package delivery start time.

Specific package delivery manifest requests in accordance with the foregoing may be utilized in the delivery of various opaque objects according to embodiments herein. For example, independent of having established components and membership in the various service grades, a CP system may also request service for a specific opaque package. The CP system may use a specific package delivery manifest request for such an opaque package, wherein the request may not be directed to an established component but rather to a service or member service grade(s). For example, where an opaque object has a set of defined attributes (e.g., file size and delivery requirements) meeting an opaque file delivery component corresponding to a general package delivery manifest (e.g., establishing a file size range and minimum delivery requirements for the opaque file delivery component), the network may accept the opaque object and use the defined opaque file delivery component to deliver the opaque object using additional attributes/requirements of the specific package delivery manifest. The network may modify some existing component to meet the request or establish a new component. For example, where the additional attributes/requirements of the specific package delivery manifest cannot be met using an established opaque file delivery component (e.g., one of Components 4-6 of FIG. 3B fitting the general attributes of the opaque file delivery manifest) logic of gateway 111 may determine that the opaque object needs its own component defined for delivery and thus embodiments may proceed to define/redefine one or more service to comprise an opaque file delivery component using the specific package delivery manifest for the opaque object. In general it may be preferred to provide a predefined component (e.g., using a series of opaque object delivery components, such as Components 4-6 of FIG. 3B having different sets of defined attributes), such as to avoid the need to revise service metadata as new components are defined to accommodate such opaque objects from time to time.

As can be appreciated from the foregoing, communication network 100 configured according to embodiments herein allows for delivery of opaque objects using a network configuration in which opaque object packages are associated with various service grades, wherein the service grades may be configured to support specific classes of device in specific geographic areas. The network interface facilitating the opaque object delivery according to embodiments does not explicitly disclose the network architecture, although providing information from which a content provider system may indicate opaque object delivery requirements in terms of network coverage areas and network capabilities enabling flexibility with respect to opaque object delivery.

The schematic flows of FIG. 4 are generally set forth as a logical flow diagram. As such, the depicted order and labeled exchanges are indicative of exemplary embodiments of the disclosed methods. Other exchanges, steps, and methods may be conceived that are equivalent in function, logic, or effect to one or more exchanges, steps, or portions of the illustrated methods. Additionally, the format and symbols employed are provided to explain the methods and are understood not to limit the scope of the methods. Although various arrow types and line types may be employed in the flow diagrams, they are understood not to limit the scope of the corresponding methods. Indeed, some arrows or other connectors may be used to indicate only the logical flow of the methods. For instance, an arrow may indicate a waiting or monitoring period of unspecified duration between enumerated steps of the depicted methods. Additionally, the order in which a particular method occurs may or may not strictly adhere to the order of the corresponding steps shown.

Some embodiments of the above described may be conveniently implemented using a conventional general purpose or a specialized digital computer or microprocessor programmed according to the teachings herein, as will be apparent to those skilled in the computer art. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information and signals may be represented using any of a variety of different technologies and techniques. For example, data, instructions, requests, information, signals, bits, symbols, and chips that may be referenced throughout the above description may be represented by voltages, currents, electromagnetic waves, magnetic fields or particles, optical fields or particles, or any combination thereof.

Some embodiments include a computer program product comprising a computer-readable medium (media) having instructions stored thereon/in and, when executed (e.g., by a processor), perform methods, techniques, or embodiments described herein, the computer readable medium comprising sets of instructions for performing various steps of the methods, techniques, or embodiments described herein. The computer readable medium may comprise a storage medium having instructions stored thereon/in which may be used to control, or cause, a computer to perform any of the processes of an embodiment. The storage medium may include, without limitation, any type of disk including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in. Additionally, the storage medium may be a hybrid system that stored data across different types of media, such as flash media and disc media. Optionally, the different media may be organized into a hybrid storage aggregate. In some embodiments different media types may be prioritized over other media types, such as the flash media may be prioritized to store data or supply data ahead of hard disk storage media or different workloads may be supported by different media types, optionally based on characteristics of the respective workloads. Additionally, the system may be organized into modules and supported on blades configured to carry out the storage operations described herein.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

Those of skill would further appreciate that the various illustrative logical blocks, modules, circuits, and algorithm steps described in connection with the disclosure herein may be implemented as electronic hardware, computer software stored on a computing device and executed by one or more processing devices, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The techniques or steps of a method described in connection with the embodiments disclosed herein may be embodied directly in hardware, in software executed by a processor, or in a combination of the two. In some embodiments, any software module, software layer, or thread described herein may comprise an engine comprising firmware or software and hardware configured to perform embodiments described herein. In general, functions of a software module or software layer described herein may be embodied directly in hardware, or embodied as software executed by a processor, or embodied as a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium may be coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

Although the present disclosure and advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for providing one or more opaque objects from a content provider system to a network for delivery to network nodes, the one or more opaque objects being associated with streaming media content of a streaming media service, the method comprising:
   coupling the content provider system to a gateway interface configured to provide network information to the content provider system;
   facilitating, by the gateway interface, communication of the streaming media content to the network nodes;
   providing, by the gateway interface, at least a portion of the network information to the content provider system; and
   receiving, by the gateway interface, a delivery manifest for the one or more opaque objects provided by the content provider system, wherein the delivery manifest includes attributes defining service requirements for the one or more opaque objects, wherein at least one of the attributes is based at least in part on the at least a portion of the network information, wherein the at least a portion of the network information includes a service grade specifying a percentage coverage area of a particular device type pair at a specific coverage grade, and wherein the percentage coverage area of a particular device type pair at the specific coverage grade comprises data regarding currently reachable receivers in a coverage area related to the network.

2. The method of claim 1, wherein the attributes defining service requirements comprise at least one attribute selected from the group consisting of probability of successful delivery of the one or more opaque objects, delivery areas for the one or more opaque objects, relationship between the one or more opaque objects and the streaming media service, target device types for delivery of the one or more opaque objects, or time of delivery of the one or more opaque objects.

3. The method of claim 1, wherein the delivery manifest comprises a package delivery manifest selected from the group consisting of a general package delivery manifest establishing that the network is able to handle a general kind of opaque object corresponding to the one or more opaque objects and a specific package delivery manifest establishing delivery for a particular opaque object of the one or more opaque objects.

4. The method of claim 1, wherein the at least a portion of the network information includes service area information providing data regarding one or more geographic areas covered by the network, wherein the service area information comprises the service grade providing coverage attributes for one or more coverage areas of the service area information.

5. The method of claim 4, wherein the data regarding currently reachable receivers in the coverage area comprises numbers and types of the currently reachable receivers in the coverage area.

6. The method of claim 4, wherein a request for the service area information from the content provider system to the gateway interface, providing the at least a portion of the network information by the gateway interface to the content provider system, and providing the service requirements via the delivery manifest from the content provider to the gateway interface invoke a RESTful API for the gateway interface on resources and associated properties managed by a network operator of the network, wherein the RESTful API implements HTTP methods and corresponding HTTP responses.

7. An apparatus for providing one or more opaque objects from a content provider system to a network for delivery to network nodes, the one or opaque objects being associated with streaming media content of a streaming media service, the apparatus comprising:
a memory; and
at least one processor coupled to the memory, the at least one processor configured:
to interface the content provider system to a gateway configured to provide network information to the content provider system;
to facilitate, by the gateway interface, communication of the streaming media content to the network nodes;
to provide, by the gateway interface, at least a portion of the network information to the content provider system; and
to receive, by the gateway interface, a delivery manifest for the one or more opaque objects provided by the content provider system, wherein the delivery manifest includes attributes defining service requirements for the one or more opaque objects, wherein at least one of the attributes is based at least in part on the at least a portion of the network information, wherein the at least a portion of the network information includes a service grade specifying a percentage coverage area of a particular device type pair at a specific coverage grade, and wherein the percentage coverage area of a particular device type pair at the specific coverage grade comprises data regarding currently reachable receivers in a coverage area related to the network.

8. The apparatus of claim 7, wherein the attributes defining service requirements comprise at least one attribute selected from the group consisting of probability of successful delivery of the one or more opaque objects, delivery areas for the one or more opaque objects, relationship between the one or more opaque objects and the streaming media service, target device types for delivery of the one or more opaque objects, or time of delivery of the one or more opaque objects.

9. The apparatus of claim 7, wherein the delivery manifest comprises a package delivery manifest selected from the group consisting of a general package delivery manifest establishing that the network is able to handle a general kind of opaque object corresponding to the one or more opaque objects and a specific package delivery manifest establishing delivery for a particular opaque object of the one or more opaque objects.

10. The apparatus of claim 7, wherein the at least a portion of the network information includes service area information providing data regarding one or more geographic areas covered by the network.

11. The apparatus of claim 10, wherein the service area information comprises the service grade providing coverage attributes for one or more coverage areas of the service area information.

12. The apparatus of claim 11, wherein the service grade corresponds to a specific service description for a reception condition and device type.

13. The apparatus of claim 7, wherein the data regarding currently reachable receivers in the coverage area comprises numbers and types of the currently reachable receivers in the coverage area.

14. The apparatus of claim 10, wherein a request for the service area information from the content provider system to the gateway interface, providing the at least a portion of the network information by the gateway interface to the content provider system, and providing the service requirements via the delivery manifest from the content provider to the gateway interface invoke a RESTful API for the gateway interface on resources and associated properties managed by a network operator of the network, wherein the RESTful API implements HTTP methods and corresponding HTTP responses.

* * * * *